United States Patent [19]

Beukers

[11] Patent Number: 5,225,450
[45] Date of Patent: Jul. 6, 1993

[54] UNFOAMED FOIL SUITABLE AS AN ADHESIVE

[75] Inventor: Adriaan Beukers, Heemstede, Netherlands

[73] Assignee: Schreiner Luchtvaart Groep B.V., Netherlands

[21] Appl. No.: 669,866

[22] Filed: Mar. 15, 1991

Related U.S. Application Data

[62] Division of Ser. No. 352,947, May 17, 1989, abandoned.

[30] Foreign Application Priority Data

May 26, 1988 [NL] Netherlands .......................... 8801354

[51] Int. Cl.$^5$ .......................... C08J 9/14; B32B 31/14
[52] U.S. Cl. .......................................... 521/79; 156/77; 156/78; 156/79; 428/411.1; 521/80; 521/81; 521/142; 521/143; 521/180; 521/183; 521/184; 521/185; 521/189
[58] Field of Search ............... 521/183, 184, 185, 180, 521/189, 79, 80, 81, 142, 143; 428/411.1; 156/77, 78, 79

[56] References Cited

U.S. PATENT DOCUMENTS

| | | | |
|---|---|---|---|
| 3,976,605 | 8/1976 | Matsunaga et al. ................. | 521/183 |
| 4,042,541 | 8/1977 | Watts ..................................... | 521/79 |
| 4,273,820 | 6/1981 | Swietzer ............................... | 156/78 |
| 4,360,556 | 11/1982 | Heider .................................. | 521/79 |
| 4,376,003 | 3/1983 | Elbez et al. . | |
| 4,438,166 | 3/1984 | Gluck et al. ........................... | 156/79 |
| 4,656,074 | 4/1987 | Conley et al. ......................... | 521/79 |
| 4,665,105 | 6/1987 | Krutchen et al. .................... | 521/180 |
| 4,752,625 | 6/1988 | Wu et al. .............................. | 521/184 |
| 4,769,437 | 9/1988 | Blount ................................... | 521/180 |
| 4,772,636 | 9/1988 | Sakata et al. ......................... | 521/79 |

FOREIGN PATENT DOCUMENTS 0040564 11/1981 European Pat. Off. .
0095287 11/1983 European Pat. Off. .
0212970 3/1987 European Pat. Off. .

OTHER PUBLICATIONS

Patent Abstracts of Japan, vol. 11, No. 200 (C-431) [2647], Jun. 27, 1987, JP-A-62 22 833.

Primary Examiner—John Kight, III
Assistant Examiner—John M. Cooney, Jr.
Attorney, Agent, or Firm—Burns, Doane, Swecker & Mathis

[57] ABSTRACT

The invention is directed to an unfoamed foil of at least one thermoplastic resin, said foil being capable of serving as an adhesive when softened and having included therein at least one blowing agent, and to the use thereof in preparing laminates.

20 Claims, No Drawings

UNFOAMED FOIL SUITABLE AS AN ADHESIVE

This application is a divisional of application Ser. No. 07/352,947, filed May 17, 1989, now abandoned.

BACKGROUND OF THE INVENTION

The invention relates to an unfoamed foil of a thermoplastic resin capable of serving as an adhesive when softened and adapted for use in the manufacture of laminates.

Such foils are known for adhesive purposes. They belong to the so-called hot melt adhesives. This type of glued joint is important in a great many fields of the art, not only as a direct joint but also as a further protection for a screwed or bolted joint or for fillingly or structurally sealing a riveted or spot-welded plate joint.

In many fields, e.g., in the construction of trucks and in the ship- and aircraft-building industries, plating structures, assemblies of plates, shells, ribs, frames and stiffeners are realized in a laborious and labor-intensive manner by means of riveting or spot-welding. These discrete stiffenings and reinforcements can be thought of as expanded in the form of sandwich plating structures, two relatively thin plates of fiber reinforced plastic or metal with an intermediate light core material of foam or honeycomb material. Consequently, attempts have also been made to replace the plating structures by this type of laminates. This technique is often applied in the aircraft-building industry. For assembling purposes this requires massive edges. With these plates manufactured by means of an autoclave or a hot press, this generally occurs by applying separate thick laminates in the laminating phase. According to another technique pieces of impregnated fabric were manually put on a table and cut out, followed by applying the honeycomb as well as a covering layer thereon and filling the edges. This is of course extremely labor-intensive and must further be followed by a more difficult treatment cycle at elevated temperature and pressure. A more recent and improved development is that the honeycomb is coated with an adhesive, followed by assembling the whole. It is difficult, however, to obtain a homogeneous coating of adhesive. As far as a solvent is used, the coating must be dried.

European patent application 212,970 discloses an adhesive tape comprising an elastomer, a crosslinker and optionally a blowing agent. This tape is especially useful for isolation, such as sonic isolation.

SUMMARY OF THE INVENTION

It is an object of the invention to provide a new type of unfoamed foil suitable for use as an adhesive when softened (hot melt adhesive).

The invention relates to an unfoamed foil of at least one thermoplastic resin, said foil being capable of serving as an adhesive when softened and having included therein at least one blowing agent.

Surprisingly, it has been found that the foil according to the invention is eminently suited for the manufacture of all kinds of articles. As a result of the action of the foaming agent during softening there is formed a layer of foam having an adhesive effect, so that the materials to be joined are properly anchored to each other.

DETAIL DESCRIPTION OF THE PREFERRED EMBODIMENTS

The foil according to the invention is mainly an unfoamed or substantially unfoamed foil of a thermoplastic resin. The nature of this thermoplastic resin may be very different. This nature is codetermined by the materials to be glued and by the conditions at which the glued joint must stand up, as well as by the requirements imposed on the final product. In general, it is preferred to use a thermoplastic resin, the strength of which under conditions of service is equal to or greater than the strength of the weakest of the materials to be glued. Of course, this is not possible with all applications, because the strength of many plastics is less than the strength of metals. Anyhow, the nature of the materials to be glued is to be considered when selecting the material. In view of the usual conditions at which many glued joints must stand up, it is preferred to apply a thermoplastic resin having a Tg of at least 50° C., more in particular at least 100° C.

In principle, any thermoplastic resin may serve as a base resin for the foil according to the invention. It is preferred, however, to select this resin from the group consisting of polyetherimide, polycarbonate, acrylate polymers, styrene polymers, polyether sulfone, polyether ketone, polyether ether ketone, polyphenyleneoxide and mixtures of two more of these resins. More in particular, preference is given to polyetherimide, in connection with the excellent properties of this material.

The second component of the foil according to the invention is the blowing agent. This blowing agent may be selected from the group consisting of solvents for the thermoplastic resin, physical blowing agents, chemical blowing agents, water and mixtures of two or more of these blowing agents, more in particular, preference is given to the use of a blowing agent which is also a thermoplastic resin solvent, which in this connection also comprises a gelling agent. The reason for this preference first of all resides in that this selection of materials leads to a surprisingly good result, while further the manufacture of the foil can be very easy, certainly when the preparation of the thermoplastic resin or the foil prepared therefrom takes place from a solution. Anyhow, this has the advantage that no additional foreign components are introduced into the system. Moreover, the foil can be easily manufactured from a solution, with the removal of the solvent being discontinued at the moment when the desired content of solvent is present.

Examples of blowing agents to be used are, among others, di-, tri- and tetrachloromethane, trichloroethene, 1,2-dichloroethane, lower hydrocarbons, such as butane, different pentanes, hexanes and heptanes etc., which also comprise the different isomers thereof, cyclic aromatic and aliphatic hydrocarbons etc., but also lower alkanols, ethers and ketones. It is also possible to apply physical blowing agents based on the chlorofluorohydrocarbons. In connection with the injurious effect thereof, however, these are clearly not preferred.

Other examples of blowing agents are the chemical blowing agents, such as sodium bicarbonate, azodicarbonamide, azobisisobutyronitrile, diazoaminobenzene, p-toluenesulfonyl hydrazide, benzenesulfonyl hydrazide, dinitrosopentamethylenetetramine, oxybis(p-benzenesulfonyl)hydrazide, N,N'-dinitroso N,N'-dimethylterephthalamide, p-toluenesulfonyl semicarbazide, 5-phenyltetrazole, etc. These compounds can be used as such or in combination with an activator. Examples of activators are zincoid, metal salts of sulfonated compounds, activated urea, stearic acid, polyethylene glycol etc.

According to the simplest embodiment of the foil according to the invention it comprises two components, namely the resin and the blowing agent and optionally the activator for the blowing agent. It is not impossible, however, that additives may be included in the foil. Examples of such additives are selected, among others, from the group consisting of stabilizers, antioxidants, germinators, fillers, such as particulate fillers (as sand, talc, silica, clay etc.) fibers and/or liquid crystalline polymers, colorants, flame extinguishing additives, other inert additives and mixtures of two or more of the components. Further, a softener may be included in the system, which softener is for the purpose of reducing the temperature at which softening occurs. In practice, such a softener is only useful if no softening of the thermoplastic resin occurs owing to the presence of a thermoplastic resin solvent, which is also active as a softener.

Suitable softeners are, among others, the fatty acids and their metal soaps. Further, APP, polybutylene, bitumen, or extender oil, such as naphthenic and paraffinic oil, may be used. It is also possible to suitably use waxes, such as microcrystalline wax.

In certain cases it can be advantageous to include fibers in the foil. When softening and foaming same, these can orient themselves and perform a reinforcing function. In this connection, however, it is preferable to start from relatively short and thin fibers, e.g., having a thickness in the order of a few $\mu$m, e.g., 0.5 to 5 $\mu$m, and a length of maximally a few mm, e.g., from 0.1 to 3 mm.

According to another embodiment of the invention a fiber reinforcement can also be included in the foil, e.g., a "woven fabric" of glass, carbon and/or aramide fibers.

The foil according to the invention can be manufactured in different ways. According to a first method the starting product is an already existing, extruded or pressed foil, which is then provided with liquid physical blowing agent by means of impregnation of the foil with the liquid or by exposure to the vapor thereof.

Thus the foil can be easily passed through a space in which the atmosphere is saturated with vapor from the blowing agent. Velocity and degree of saturation are then a function of the temperature, the pressure and the time. When the foil is removed from the vapor-saturated chamber, a portion of the blowing agent of course evaporates again from the outer regions of the foil, but measurements have shown that in the inside of the foil the content of blowing agent remains practically constant for a prolonged period of time (weeks or months), so that the foil can be stored for a sufficient time, if so desired. The treatment of the foil with blowing agent is eminently suited for a continuous process.

However, it is also possible to manufacture a foil by extruding a mixture of the thermoplastic resin and the other components or shaping it in a different way. According to a third method the foil can be manufactured by means of the method of "solvent casting", in which a solution of the thermoplastic resin is shaped to a foil, followed by removing the solvent carefully. In the manufacture of the foil according to the invention the same technique can be used, but it will suffice to remove the solvent in part.

The blowing agent is preferably integrally present (i.e. homogeneously divided) in the foil, that is to say the content is roughly equal throughout the thickness of the foil. However, it may sometimes be advantageous to have a gradient of the concentration of blowing agent. In particular, it may be interesting to provide that the blowing agent is present substantially on one side. This can be achieved, e.g., by impregnating on one side with vapor or by removing only on one side.

The content of blowing agent may vary within broad limits. The lower limit is determined by the fact that a certain degree of foaming must be present for a proper adhesion. Of course, this remains dependent on the specific combination of material, but a proper lower limit is formed by a content of at least 0.5 wt. % blowing agent, based on the weight of the thermoplastic resin and the blowing agent together. Usual contents range from 1 to 50 wt. %. The upper limit is substantially determined by the fact that the foil must still be manageable and may not be too weak, at least in the case of using a thermoplastic resin solvent as a blowing agent.

Another measure of the amount of blowing agent is the vol. % of pores. This is preferably in excess of 10 vol. %.

The thickness of the foil may vary within broad limits, depending on its use. This range is from 10 $\mu$m to, e.g., 2 mm. A thicker foil is hardly useful, because it is easier to apply two layers than to properly and regularly foam a thicker foil.

After the manufacture of the foil it is brought to the required size, if desired, and further processed or stored. When volatile blowing agents are used, it is preferred that the foil be provided with a protective foil of another material, which is preferably not or only slightly permeable to the blowing agent. Materials suitable therefor are the known barrier materials, such as PVA and coextruded multilayer foils, e.g., provided with at least one layer of a polyamide. According to a preferred embodiment of the invention the foil is coiled after manufacture with an intermediate layer of another resin foil which is not affected by the blowing agent.

The invention also provides a process for adhering two materials together, which comprises interposing a foil according to the invention between these materials and then heating at least the foil. There are a number of possibilities for this heating. The total assembly of materials to be adhered can be heated, but it is also possible to heat only one side or even to heat only the foil.

Some embodiments will hereinbelow be discussed in more detail.

In case two plates with an intermediate core material, preferably a honeycomb structure are to be adhered together, it is normally extremely difficult to apply a uniform adhesive layer on the thin sides of the cells of the honeycomb. Furthermore, there is only formed a very local glued joint. By means of the invention it is easy to apply an adhesive foil, preferably polyetherimide, provided with a blowing agent between plate and honeycomb and then to heat the whole, while at the same time the thermoplastic resin is going to function as an adhesive and foams. Consequently, anchorage to the honeycomb takes place and a better and more reliable adhesion is obtained in a much easier way. Of course, the honeycomb can be laminated either successively or in one operation on both sides.

Further advantages of the novel gluing method are that a greater impact strength and a greater pressure strength are obtained, for the free collapsing length of the honeycomb is reduced because the honeycomb absorbs the foam. This collapsing length depends on the square of the length, so that a shortening has a square effect. Furthermore, better thermal and acoustic isolation is obtained with the combination of honeycomb and foam.

A special application of the above is the protection against ballistic missiles (e.g., projectiles such as bullets, etc.) by means of a covering layer of ceramic material. According to the present invention the honeycomb can be suitably filled with a mixture of ceramic globules and foaming thermoplastic resin. The globules and the propellant are together incorporated in the honeycomb when the adhesive is foamed, so that a homogeneous filling having a desired content of globules can be formed in the entire honeycomb.

Another possibility for creating a barrier against ballistic missiles using the present invention is formed by the layer-by-layer application of fibrous mat and foil according to the invention, which structure is then heated, so that the foil foams and adheres to the fibrous mat, but does not impregnate it. Such a structure with fibers that are not or anyway not completely impregnated being applied between layers of foam forms a good barrier against ballistic missiles.

If it is wished to connect a honeycomb structure to another part, a complete edge finish is required. According to the state of the art filled edges are obtained with so-called prepregs (massive laminate) or with a preferably filled resin. According to the invention there are different possibilities of obtaining filled edges. Edges can simply be pressed, which is known per se as core crushing. Thus a kind of finish is obtained which, however, is not yet strong, for the honeycomb is damaged. It is better to manufacture a laminate-with-honeycomb to provide this with a slit and place therein a foil according to the invention containing a blowing agent, and to heat and thus fill the whole. Moreover, the thus obtained edges can be pressed, resulting in a structural edge which is also durable.

Another problems arises from the wish to have a reinforcement in the middle of a laminate-with-honeycomb. This is sometimes needed in component production. For this purpose it has hitherto been necessary to apply a resin filling, i.e. a kind of encapsulation (potting). This is laborious and difficult, for the honeycomb has to be locally filled completely. Thus it is possible to anchor or fix a metal part and to obtain a great strength.

According to the invention a foil can be locally superposed and heated under light pressure. The adhesive foam, optionally with a filler, penetrates itself, resulting in a structural filling. If required, there can also be pressed on site.

The invention has been illustrated above mainly on the basis of a honeycomb core material, because of some special advantages resulting therefrom. The invention, however, can also be applied to other core materials, such as balsa wood and foams of resins, both thermoplastic and thermosetting resins.

In general, the invention therefore also relates to a process for manufacturing a laminate, which comprises adhering together a core layer and at least one other layer by means of the foil accordig to the invention. The core layer generally comprises the above-mentioned materials, while the other layer may consist of wood, metal or a resin plate optionally reinforced with fibers, such as a woven or knit fabric.

With regard to the nature of the resin for the core material and/or the other layer it is observed that this fully depends on the use of the laminate. For the more high-grade uses the same resins will generally be applied as described for the foil, as far as thermoplastic resins are concerned. As thermosetting resins, polyurethanes, epoxy resin based systems and unsaturated polyesters are preferentially considered.

Also the selection of the metal depends on the use, while it stands to reason that for aeronautical applications aluminum will soon be adopted.

The other layer, often a top layer, is reinforced with fibers in order to obtain a high-grade laminate. These may be all kinds of fibers, such as glass, carbon, metal and polyamide (more in particular aramide) fibers.

The fibers may be applied on all sides, but it is preferred that these be applied either unidirectionally or in an arrangement, such as a woven or knit fabric.

It is observed that the blowing agent can temporarily reduce the softening temperature of the thermoplastic adhesives. This, too, can be determined by means of simple pretests. Not only flat plates, but also single- or double-curved plates can be laminated according to the invention with the present foils. Curved plates reinforced with continuous fibers are used for this purpose. During the heating required in the process according to the invention the curve is maintained.

In addition, during the heating before foaming, a deformation of the skin may take place, if a thermoplastic skin is used. On it, there can also be made articles the top layers of which do not parallel each other.

The invention will now be illustrated by means of the following, non-restrictive examples.

EXAMPLE 1

A foil having a thickness of 400 $\mu$m of polyetherimide (Ultem) was impregnated with dichloromethane by passing the foil through a vapor of dichloromethane. After impregnation the content of dichloromethane in the foil was about 20 wt. %. The dichloromethane was almost integrally distributed through the foil.

A laminate was built up from two layers of 100 g glass fabric impregnated with polyetherimide (weight ratio 1:1), having an intermediate layer of the impregnated foil. This assembly was placed in a mould heated to 120° C., which was closed for 2.5 s. There was thus obtained a flat sandwich material having a thickness of 6.4 cm.

The properties of this sandwich material were as follows:

| | |
|---|---|
| Specific weight | 110 kg/m$^3$ |
| E-modulus (pressure) | 50 N/mm$^2$ |
| E-modulus (tension) | 35 N/mm$^2$ |
| Shearing strength | 1.5 N/mm$^2$ |
| Compressive strength | 3 MPa |
| Tensile strength | 5 MPa |
| Flexural strength | 220 MPa |
| Flexural stiffness | 3.2*10$^6$ N · mm$^2$/cm |

The above result indicates clearly that good materials are obtainable using the invention.

EXAMPLE 2

Two metal layers were adhered together at a temperature of 120° C., using a foil comparable to the foil used in Example 1 but having a thickness of 50 $\mu$m. The strength of the adhesion between the metals corresponded to the self-strength of the polyetherimide. From this it may be concluded that the properties of the polyetherimide are not adversely affected by the treatment with a blowing agent.

I claim:

1. A process for adhering materials together, comprising the steps of:
   (a) interposing between the surfaces of the materials at least one extruded or pressed foil of thermoplastic resin having incorporated therein at least one blowing agent, thereby forming an assembly of the foil and the materials to be adhered together;
   (b) heating the assembly in a mold to a temperature sufficient to cause foaming of the foil, thereby forming a layer of foamed foil between the surfaces of the materials;
   (c) adhering the surfaces of the materials together during the heating and foaming step (b); and
   (d) removing the adhered materials from the mold.

2. A process according to claim 1, wherein the layer of foamed foil contains pores in an amount in excess of 10% by volume.

3. A process according to claim 1, wherein the blowing agent is selected from the group consisting of solvents for the thermoplastic resin, physical blowing agents, chemical blowing agents, water, and mixtures thereof.

4. A process according to claim 3, wherein the blowing agent includes a solvent for the thermoplastic resin.

5. A process according to claim 1, wherein the thermoplastic resin has a Tg of at least 50 C.

6. A process according to claim 5, wherein the thermoplastic resin is selected from the group consisting of polyetherimide, polycarbonate, acrylate polymers, styrene polymers, polyether sulfone, polyether ketone, polyether ether ketone, polyphenylene oxide and mixtures thereof.

7. A process according to claim 1, wherein the blowing agent is present in an amount of between about 1% and about 50% by weight based on the total weight of thermoplastic resin and blowing agent.

8. A process according to claim 7, wherein the amount of blowing is between about 5% and about 30% by weight.

9. A process according to claim 1, wherein the foil includes one or more additives selected from the group consisting of particulate fillers, fibers, liquid crystalline polymers, and mixtures thereof.

10. A process according to claim 1, wherein the foil comprises from about 50% to about 99% by weight thermoplastic resin, from about 1% to about 50% by weight blowing agent, and from 0 to about 15% by weight of an additive selected from the group consisting of stabilizers, antioxidants, fillers, colorants, flame extinguishing additives and mixtures thereof.

11. A process according to claim 10, wherein the fillers are selected from the group consisting of fibers, liquid crystalline polymers and mixtures thereof.

12. A process for forming a laminate having a foam core and outer layers adhered to the foam core, comprising the steps of:
    (a) forming an unfoamed laminate comprising the outer layers and at least one intermediate layer of extruded or pressed thermoplastic resin foil having incorporated therein at least one blowing agent, the foil being interposed between the outer layers;
    (b) heating the unfoamed laminate to a temperature sufficient to cause foaming of the foil, thereby forming a layer of foamed foil between the outer layers;
    (c) adhering at least one of the outer layers to the layer of foamed foil during the heating and foaming step (b), thereby forming a laminate; and
    (d) removing the laminate from the mold.

13. A process according to claim 12, wherein the top layers each comprise a fiber-reinforced thermoplastic resin.

14. A process according to claim 12, wherein both outer layers are adhered to the layer of foamed foil.

15. A process according to claim 12, wherein at least one of the outer layers is a material selected from the group consisting of thermoplastic resin, fiber-reinforced thermoplastic resin, thermosetting resin, fiber-reinforced thermosetting resin, metal and mixtures thereof.

16. A process according to claim 12, wherein the unfoamed laminate includes a honeycomb material between the outer layers, and wherein the heating and foaming step (b) includes penetration of the foaming foil into interstices of the honeycomb material.

17. A process according to claim 12, wherein the unfoamed laminate includes an integral foam material between the outer layers, and wherein the heating and foaming step (b) includes penetration of the foaming foil into interstices of the integral foam material.

18. A process according to claim 12, wherein during the heating and foaming step (b), at least one of the outer layers is deformed.

19. A laminate formed by the process of claim 12.

20. A laminate formed by the process of claim 14.

* * * * *